Patented Oct. 17, 1933

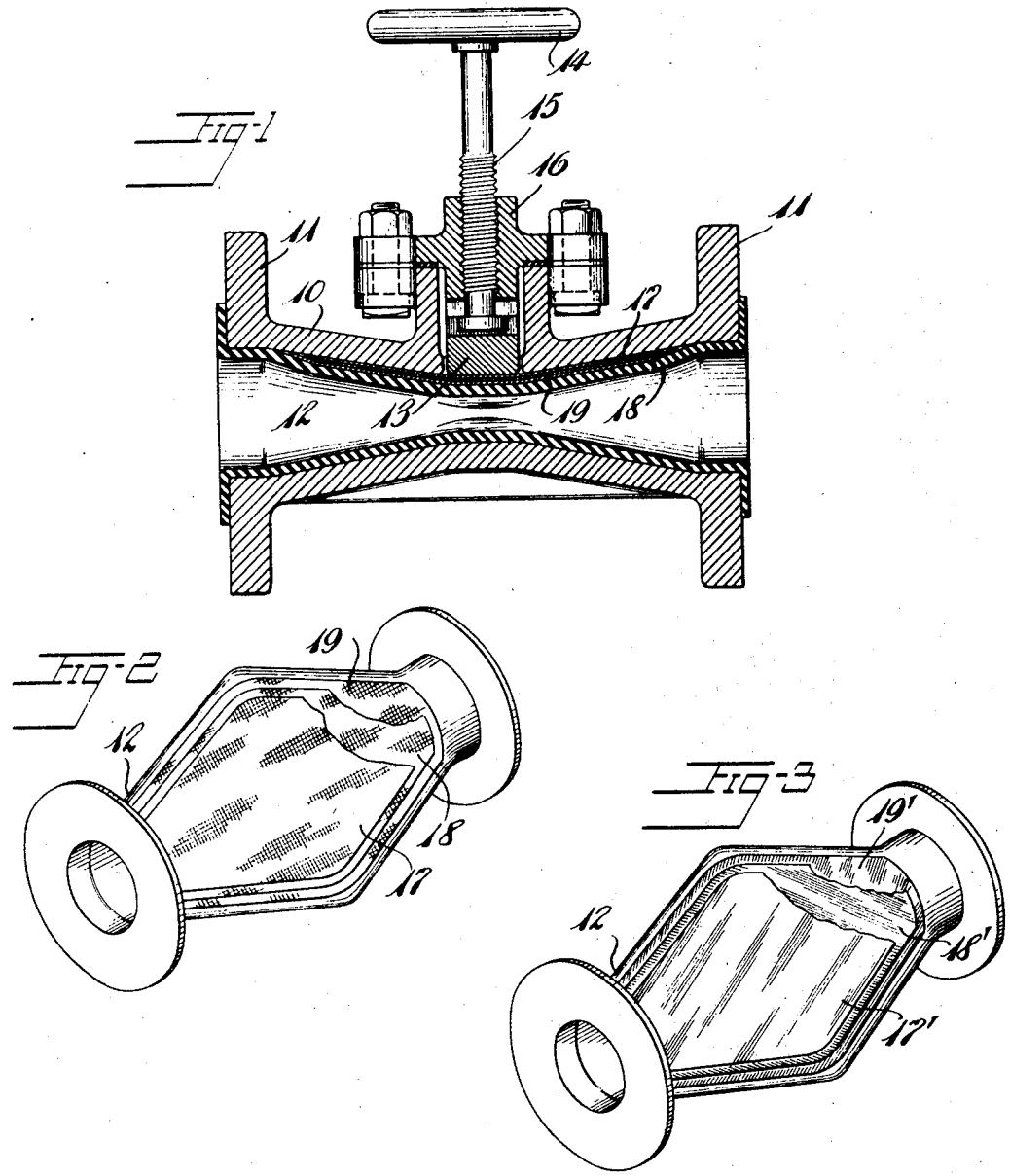

1,931,320

UNITED STATES PATENT OFFICE 1,931,320

VALVE FOR CORROSIVE LIQUIDS

Fred L. Haushalter, Akron, Ohio, assignor to The B. F. Goodrich Company, New York, N. Y., a corporation of New York Application September 10, 1931
Serial No. 562,070

2 Claims. (Cl. 251—5)

This invention relates to valves and more particularly to valves for corrosive liquids in which a flexible conduit is provided for conducting the liquid and means are provided for pinching the tube to regulate or to prevent the flow.

The objects of the invention are to provide a valve lining or conduit which may be readily replaced, which will provide a continuous fluid passage through the valve, and which will be reinforced to prevent rupture and wear over that part of the conduit subjected to the action of moving parts.

In the accompanying drawing Fig. 1 is a vertical cross-sectional view of a valve provided with the improved conduit.

Fig. 2 is a perspective view of one form of the invention, part of the reinforcement being broken away.

Fig. 3 is a similar view of another form of the invention, parts of the reinforcement being broken away.

Referring to the drawing, the numeral 10 designates the valve body, made of rigid material, and provided with flanges 11. The flexible conduit 12 extends through a passage, correspondingly shaped, and is also provided with flanges adapted to lie between the flanges 11 and their companion flanges on adjacent apparatus. The valve is provided with a movable bar 13 for traversing the flexible conduit 12 and pinching it to closed position and a hand wheel 14 is provided with a threaded stem 15 threaded in a bushing 16 fixed to the valve body for the purpose of adjusting the bar 13.

The conduit 12 is made of soft vulcanized rubber or other flexible impervious material. In order to prevent rupture or abrasion of the conduit at the zone thereof where the bar 13 contacts therewith, I provide a reinforcement of flexible wear-resisting material united to the rubber lining. This reinforcement preferably comprises one or more layers of rubberized fabric such as cord fabric or square woven fabric, three such layers being shown in the drawing and designated by the numerals 17, 18 and 19.

As will be seen from an inspection of Figs. 2 and 3, the conduit is broadened and flattened near its center and the reinforcing layers 17, 18, and 19 of Fig. 2 and 17′, 18′ and 19′ of Fig. 3 are so shaped as to conform to the surface of one side of the conduit, the largest layer 19 or 19′ being somewhat less in extent than the corresponding side of the conduit and the succeeding layers being of even less extent so as to provide a stepping off of the reinforcement toward its edges and a gradual increase in flexibility toward the unreinforced sides where a sharp hinging of the conduit is required.

In the form shown in Fig. 2 the reinforcing layers comprise square woven fabric whereas in the form shown in Fig. 3 the layers comprise weak-wefted or weftless cord fabric, such as is used in constructing pneumatic tires, laid with the cords in adjacent plies crossing each other. In either form the reinforcement prevents abrasion and sharp bending of the conduit at the edges of the bar 13. The reinforcement also supports the portions of the conduit which are out of contact with the walls of the valve body when the valve is closed or nearly closed.

I claim:

1. A valve comprising a rigid casing, a removable, collapsible conduit constituting a lining therefor, means traversing a wall of the casing for collapsing the conduit, and a reinforcement applied to that part of the conduit which contacts with the collapsing means, said reinforcement extending along the conduit beyond the contacted portion thereof and comprising a plurality of stepped plies of rubberized fabric terminating short of the conduit margins that are sharply flexed upon collapse of the conduit.

2. A valve comprising a rigid casing, a removable, collapsible conduit constituting a lining therefor, means traversing a wall of the casing for collapsing the conduit, and a reinforcement applied to that part of the conduit which contacts with the collapsing means, said reinforcement extending along the conduit beyond the contacted portion thereof and comprising a plurality of stepped plies of cord fabric terminating short of the conduit margins that are sharply flexed upon collapse of the conduit.

FRED L. HAUSHALTER.